US012265900B2

(12) United States Patent
Dohrmann et al.

(10) Patent No.: US 12,265,900 B2
(45) Date of Patent: Apr. 1, 2025

(54) COMPUTING DEVICES WITH IMPROVED INTERACTIVE ANIMATED CONVERSATIONAL INTERFACE SYSTEMS

(71) Applicant: Electronic Caregiver, Inc., Las Cruces, NM (US)

(72) Inventors: Anthony Dohrmann, Las Cruces, NM (US); Bryan J. Chasko, Las Cruces, NM (US); Samuel Blake, Las Cruces, NM (US)

(73) Assignee: Electronic Caregiver, Inc., Las Cruces, NM (US)

( * ) Notice: Subject to any disclaimer, the term of this patent is extended or adjusted under 35 U.S.C. 154(b) by 0 days.

(21) Appl. No.: 16/169,760

(22) Filed: Oct. 24, 2018

(65) Prior Publication Data
US 2019/0220727 A1    Jul. 18, 2019

Related U.S. Application Data

(60) Provisional application No. 62/618,550, filed on Jan. 17, 2018.

(51) Int. Cl.
*G06F 3/048* (2013.01)
*G06F 9/451* (2018.01)
*G06F 16/23* (2019.01)
*G06F 40/174* (2020.01)
*G06N 3/006* (2023.01)

(52) U.S. Cl.
CPC ............. *G06N 3/006* (2013.01); *G06F 9/453* (2018.02); *G06F 16/23* (2019.01); *G06F 40/174* (2020.01)

(58) Field of Classification Search
CPC ......... G06N 3/006; G06F 16/23; G06F 9/453; G06F 17/243; G06F 3/048
See application file for complete search history.

(56) References Cited

U.S. PATENT DOCUMENTS

| 5,211,642 A | 5/1993 | Clendenning |
| 5,475,953 A | 12/1995 | Greenfield |

(Continued)

FOREIGN PATENT DOCUMENTS

| AU | 2019240484 B2 | 11/2021 |
| CA | 2949449 A1 | 11/2015 |

(Continued)

OTHER PUBLICATIONS

Leber, Jessica, "The Avatar will See You Now", Sep. 17, 2013, MIT Technology Review (Year: 2013).*

(Continued)

*Primary Examiner* — Jeanette J Parker
(74) *Attorney, Agent, or Firm* — Carr & Ferrell LLP

(57) ABSTRACT

A conversational interface system including an interactive virtual avatar and method for completing and updating fillable forms and database entries. The conversational interface provides a user with the option of inputting data in either text or voice form, and logs user response data and populates fields within form documents. As the user progresses through the system, instructions and guidance are consistently provided via the interactive avatar presented within the system web browser. Without exiting the system, the conversational interface validates user input data types and data while updating entries within cloud-based databases.

20 Claims, 20 Drawing Sheets

(56) References Cited

U.S. PATENT DOCUMENTS

| | | |
|---|---|---|
| 6,665,647 B1 | 12/2003 | Haudenschild |
| 7,233,872 B2 | 6/2007 | Shibasaki et al. |
| 7,445,086 B1 | 11/2008 | Sizemore |
| 7,612,681 B2 | 11/2009 | Azzaro et al. |
| 7,971,141 B1* | 6/2011 | Quinn .................... G06Q 40/10 |
| | | 715/721 |
| 8,206,325 B1 | 6/2012 | Najafi et al. |
| 8,771,206 B2 | 7/2014 | Gettelman et al. |
| 9,317,916 B1 | 4/2016 | Hanina et al. |
| 9,591,996 B2 | 3/2017 | Chang et al. |
| 9,972,187 B1 | 5/2018 | Srinivasan et al. |
| 10,387,963 B1* | 8/2019 | Leise ..................... G06Q 40/08 |
| 10,417,388 B2 | 9/2019 | Han et al. |
| 10,628,635 B1* | 4/2020 | Carpenter, II ........ G06F 40/279 |
| 10,761,691 B2 | 9/2020 | Anzures et al. |
| 10,813,572 B2 | 10/2020 | Dohrmann et al. |
| 10,943,407 B1 | 3/2021 | Morgan et al. |
| 11,113,943 B2 | 9/2021 | Wright et al. |
| 11,213,224 B2 | 1/2022 | Dohrmann et al. |
| 2002/0062342 A1 | 5/2002 | Sidles |
| 2002/0196944 A1 | 12/2002 | Davis et al. |
| 2004/0109470 A1* | 6/2004 | Derechin .................. G06F 9/54 |
| | | 370/465 |
| 2004/0189708 A1 | 9/2004 | Larcheveque |
| 2005/0035862 A1 | 2/2005 | Wildman et al. |
| 2005/0055942 A1 | 3/2005 | Maelzer et al. |
| 2007/0032929 A1 | 2/2007 | Yoshioka |
| 2007/0238936 A1 | 10/2007 | Becker |
| 2008/0010293 A1* | 1/2008 | Zpevak .................. G06Q 10/06 |
| 2008/0186189 A1 | 8/2008 | Azzaro et al. |
| 2009/0094285 A1* | 4/2009 | Mackle ................. G06F 16/639 |
| 2010/0124737 A1 | 5/2010 | Panzer |
| 2011/0126207 A1 | 5/2011 | Wipfel et al. |
| 2011/0145018 A1 | 6/2011 | Fotsch et al. |
| 2011/0232708 A1 | 9/2011 | Kemp |
| 2012/0025989 A1 | 2/2012 | Cuddihy et al. |
| 2012/0075464 A1 | 3/2012 | Derenne et al. |
| 2012/0120184 A1 | 5/2012 | Fornell et al. |
| 2012/0121849 A1 | 5/2012 | Nojima |
| 2012/0154582 A1 | 6/2012 | Johnson et al. |
| 2012/0165618 A1* | 6/2012 | Algoo .................... G16H 50/20 |
| | | 600/300 |
| 2012/0179067 A1 | 7/2012 | Wekell |
| 2012/0179916 A1 | 7/2012 | Staker et al. |
| 2012/0229634 A1 | 9/2012 | Laett et al. |
| 2012/0253233 A1 | 10/2012 | Greene et al. |
| 2013/0000228 A1 | 1/2013 | Ovaert |
| 2013/0060167 A1 | 2/2013 | Dracup |
| 2013/0123667 A1* | 5/2013 | Komatireddy .......... A61B 5/746 |
| | | 600/595 |
| 2013/0127620 A1 | 5/2013 | Siebers et al. |
| 2013/0145449 A1 | 6/2013 | Busser et al. |
| 2013/0167025 A1* | 6/2013 | Patri ..................... G06F 3/0481 |
| | | 715/706 |
| 2013/0204545 A1 | 8/2013 | Solinsky |
| 2013/0212501 A1* | 8/2013 | Anderson ............. G06F 3/0484 |
| | | 715/764 |
| 2013/0237395 A1 | 9/2013 | Hjelt et al. |
| 2013/0289449 A1 | 10/2013 | Stone et al. |
| 2013/0303860 A1 | 11/2013 | Bender et al. |
| 2014/0074454 A1 | 3/2014 | Brown et al. |
| 2014/0128691 A1 | 5/2014 | Olivier |
| 2014/0148733 A1 | 5/2014 | Stone et al. |
| 2014/0171039 A1 | 6/2014 | Bjontegard |
| 2014/0171834 A1 | 6/2014 | DeGoede et al. |
| 2014/0214441 A1* | 7/2014 | Young .................... G16H 10/20 |
| | | 705/2 |
| 2014/0232600 A1 | 8/2014 | Larose et al. |
| 2014/0243686 A1 | 8/2014 | Kimmel |
| 2014/0257852 A1 | 9/2014 | Walker et al. |
| 2014/0267582 A1 | 9/2014 | Beutter et al. |
| 2014/0278605 A1* | 9/2014 | Borucki ............... G06Q 30/0617 |
| | | 705/5 |
| 2014/0317502 A1 | 10/2014 | Brown et al. |
| 2014/0330172 A1 | 11/2014 | Jovanov et al. |
| 2014/0337048 A1 | 11/2014 | Brown et al. |
| 2014/0358828 A1 | 12/2014 | Phillipps et al. |
| 2014/0368601 A1 | 12/2014 | deCharms |
| 2015/0005674 A1 | 1/2015 | Schindler |
| 2015/0019250 A1 | 1/2015 | Goodman et al. |
| 2015/0109442 A1 | 4/2015 | Derenne et al. |
| 2015/0142704 A1* | 5/2015 | London ............... G10L 15/1822 |
| | | 706/11 |
| 2015/0169835 A1 | 6/2015 | Hamdan et al. |
| 2015/0359467 A1 | 12/2015 | Tran |
| 2016/0026354 A1 | 1/2016 | McIntosh et al. |
| 2016/0117470 A1 | 4/2016 | Welsh et al. |
| 2016/0117484 A1 | 4/2016 | Hanina et al. |
| 2016/0154977 A1* | 6/2016 | Jagadish ............. G06F 21/6254 |
| | | 726/26 |
| 2016/0217264 A1 | 7/2016 | Sanford |
| 2016/0253890 A1 | 9/2016 | Rabinowitz et al. |
| 2016/0267327 A1 | 9/2016 | Franz et al. |
| 2016/0314255 A1 | 10/2016 | Cook et al. |
| 2017/0000387 A1 | 1/2017 | Forth et al. |
| 2017/0000422 A1 | 1/2017 | MIoturu et al. |
| 2017/0024531 A1 | 1/2017 | Malaviya |
| 2017/0055917 A1 | 3/2017 | Stone et al. |
| 2017/0140631 A1 | 5/2017 | Pietrocola et al. |
| 2017/0147154 A1 | 5/2017 | Steiner et al. |
| 2017/0192950 A1 | 7/2017 | Gaither et al. |
| 2017/0193163 A1 | 7/2017 | Melle et al. |
| 2017/0197115 A1 | 7/2017 | Cook et al. |
| 2017/0213145 A1 | 7/2017 | Pathak et al. |
| 2017/0223176 A1 | 8/2017 | Anzures et al. |
| 2017/0273601 A1 | 9/2017 | Wang et al. |
| 2017/0336933 A1 | 11/2017 | Hassel |
| 2017/0337274 A1* | 11/2017 | Ly ......................... H04M 1/271 |
| 2017/0344706 A1 | 11/2017 | Torres et al. |
| 2017/0344832 A1 | 11/2017 | Leung et al. |
| 2018/0005448 A1 | 1/2018 | Choukroun et al. |
| 2018/0075558 A1 | 3/2018 | Hill, Sr. et al. |
| 2018/0096504 A1 | 4/2018 | Valdivia et al. |
| 2018/0154514 A1 | 6/2018 | Angle et al. |
| 2018/0165938 A1 | 6/2018 | Honda et al. |
| 2018/0182472 A1 | 6/2018 | Preston et al. |
| 2018/0189756 A1* | 7/2018 | Purves ................. G06Q 20/105 |
| 2018/0322405 A1 | 11/2018 | Fadell et al. |
| 2018/0360349 A9 | 12/2018 | Dohrmann et al. |
| 2018/0365383 A1 | 12/2018 | Bates |
| 2018/0368780 A1 | 12/2018 | Bruno et al. |
| 2019/0029900 A1 | 1/2019 | Walton et al. |
| 2019/0042700 A1 | 2/2019 | Alotaibi |
| 2019/0043474 A1* | 2/2019 | Kingsbury ............ G06F 40/117 |
| 2019/0057320 A1 | 2/2019 | Docherty et al. |
| 2019/0090786 A1 | 3/2019 | Kim et al. |
| 2019/0116212 A1* | 4/2019 | Spinella-Mamo .......................... |
| | | H04L 65/4023 |
| 2019/0130110 A1 | 5/2019 | Lee et al. |
| 2019/0156575 A1 | 5/2019 | Korhonen |
| 2019/0164015 A1 | 5/2019 | Jones, Jr. et al. |
| 2019/0176043 A1 | 6/2019 | Gosine et al. |
| 2019/0196888 A1 | 6/2019 | Anderson et al. |
| 2019/0259475 A1 | 8/2019 | Dohrmann et al. |
| 2019/0282130 A1 | 9/2019 | Dohrmann et al. |
| 2019/0286942 A1 | 9/2019 | Abhiram et al. |
| 2019/0311792 A1 | 10/2019 | Dohrmann et al. |
| 2019/0318165 A1 | 10/2019 | Shah et al. |
| 2019/0385749 A1 | 12/2019 | Dohrmann et al. |
| 2020/0101969 A1 | 4/2020 | Natroshvili et al. |
| 2020/0236090 A1 | 7/2020 | De Beer et al. |
| 2020/0251220 A1 | 8/2020 | Chasko |
| 2020/0357256 A1 | 11/2020 | Wright et al. |
| 2020/0357511 A1 | 11/2020 | Sanford |
| 2021/0007631 A1 | 1/2021 | Dohrmann et al. |
| 2021/0110894 A1 | 4/2021 | Shriberg et al. |
| 2021/0273962 A1 | 9/2021 | Dohrmann et al. |
| 2021/0358202 A1 | 11/2021 | Tveito et al. |
| 2021/0398410 A1 | 12/2021 | Wright et al. |
| 2022/0022760 A1 | 1/2022 | Salcido et al. |
| 2022/0199252 A1 | 6/2022 | Dohrmann et al. |

(56) References Cited

U.S. PATENT DOCUMENTS

| | | | |
|---|---|---|---|
| 2022/0319696 | A1 | 10/2022 | Dohrmann et al. |
| 2022/0319713 | A1 | 10/2022 | Dohrmann et al. |
| 2022/0319714 | A1 | 10/2022 | Dohrmann et al. |

FOREIGN PATENT DOCUMENTS

| | | | |
|---|---|---|---|
| CN | 104361321 | A | 2/2015 |
| CN | 106056035 | A | 10/2016 |
| CN | 106940692 | A | 7/2017 |
| CN | 107411515 | A | 12/2017 |
| CN | 111801645 | A | 10/2020 |
| CN | 111801939 | A | 10/2020 |
| CN | 111867467 | A | 10/2020 |
| CN | 113795808 | | 12/2021 |
| EP | 3703009 | A1 | 9/2020 |
| EP | 3740856 | A1 | 11/2020 |
| EP | 3756344 | A1 | 12/2020 |
| EP | 3768164 | A1 | 1/2021 |
| EP | 3773174 | A1 | 2/2021 |
| EP | 3815108 | A1 | 5/2021 |
| EP | 3920797 | A1 | 12/2021 |
| EP | 3944258 | | 1/2022 |
| EP | 3966657 | A | 3/2022 |
| IN | 202027033318 | A | 10/2020 |
| IN | 202027035634 | A | 10/2020 |
| IN | 202127033278 | A | 8/2022 |
| JP | 2000232963 | A | 8/2000 |
| JP | 2002304362 | A | 10/2002 |
| JP | 2005228305 | A | 8/2005 |
| JP | 2008062071 | A | 3/2008 |
| JP | 2008123318 | A | 5/2008 |
| JP | 2008229266 | A | 10/2008 |
| JP | 2010172481 | A | 8/2010 |
| JP | 2012232652 | A | 11/2012 |
| JP | 2016137226 | A | 8/2016 |
| JP | 2016525383 | A | 8/2016 |
| JP | 2017187914 | A | 10/2017 |
| KR | 1020160040078 | A | 4/2016 |
| KR | 20170069501 | A | 6/2017 |
| KR | 1020200105519 | A | 9/2020 |
| KR | 1020200121832 | A | 10/2020 |
| KR | 1020200130713 | A | 11/2020 |
| WO | WO2000005639 | A2 | 2/2000 |
| WO | WO2014043757 | A1 | 3/2014 |
| WO | WO2014210344 | A1 | 12/2014 |
| WO | WO2017118908 | A1 | 7/2017 |
| WO | WO2018032089 | A1 | 2/2018 |
| WO | WO2019143397 | A1 | 7/2019 |
| WO | WO2019164585 | A1 | 8/2019 |
| WO | WO2019182792 | A1 | 9/2019 |
| WO | WO2019199549 | A1 | 10/2019 |
| WO | WO2019245713 | A1 | 12/2019 |
| WO | WO2020163180 | A1 | 8/2020 |
| WO | WO2020227303 | A1 | 11/2020 |

OTHER PUBLICATIONS

"International Search Report" and "Written Opinion of the International Searching Authority," Patent Cooperation Treaty Application No. PCT/US2018/057814, Jan. 11, 2019, 9 pages.
"International Search Report" and "Written Opinion of the International Searching Authority," Patent Cooperation Treaty Application No. PCT/US2018/068210, Apr. 12, 2019, 9 pages.
Bajaj, Prateek, "Reinforcement Learning", GeeksForGeeks.org [online], [retrieved on Mar. 4, 2020], Retrieved from the Internet :<URL:https://www.geeksforgeeks.org/what-is-reinforcement-learning/>, 7 pages.
Kung-Hsiang, Huang (Steeve), "Introduction to Various RL Algorithms. Part I (Q-Learning, SARSA, DQN, DDPG)", Towards Data Science, [online], [retrieved on Mar. 4, 2020], Retrieved from the Internet :<URL:https://towardsdatascience.com/introduction-to-various-reinforcement-learning-algorithms-i-q-learning-sarsa-dqn-ddpg-72a5e0cb6287>, 5 pages.
Bellemare et al., A Distributional Perspective on Reinforcement Learning:, Proceedings of the 34th International Conference on Machine Learning, Sydney, Australia, Jul. 21, 2017, 19 pages.
Friston et al., "Reinforcement Learning or Active Inference?" Jul. 29, 2009, [online], [retrieved on Mar. 4, 2020], Retrieved from the Internet :<URL:https://doi.org/10.1371/journal.pone.0006421 PLoS One 4(7): e6421>, 13 pages.
Zhang et al., "DQ Scheduler: Deep Reinforcement Learning Based Controller Synchronization in Distributed SDN" ICC 2019—2019 IEEE International Conference on Communications (ICC), Shanghai, China, doi: 10.1109/ICC.2019.8761183, pp. 1-7.
"International Search Report" and "Written Opinion of the International Searching Authority," Patent Cooperation Treaty Application No. PCT/US2020/016248, May 11, 2020, 7 pages.
"International Search Report" and "Written Opinion of the International Searching Authority," Patent Cooperation Treaty Application No. PCT/US2019/021678, May 24, 2019, 12 pages.
"International Search Report" and "Written Opinion of the International Searching Authority," Patent Cooperation Treaty Application No. PCT/US2019/025652, Jul. 18, 2019, 11 pages.
"International Search Report" and "Written Opinion of the International Searching Authority," Patent Cooperation Treaty Application No. PCT/US2019/034206, Aug. 1, 2019, 11 pages.
Rosen et al., "Slipping and Tripping: Fall Injuries in Adults Associated with Rugs and Carpets," Journal of Injury & Violence Research, 5(1), 61-69. (2013).
"Office Action", India Patent Application No. 202027035634, Jun. 30, 2021, 10 pages.
"Office Action", India Patent Application No. 202027033121, Jul. 29, 2021, 7 pages.
"Office Action", Canada Patent Application No. 3088396, Aug. 6, 2021, 7 pages.
"Office Action", China Patent Application No. 201880089608.2, Aug. 3, 2021, 8 pages.
"Office Action", Japan Patent Application No. 2020-543924, Jul. 27, 2021, 3 pages [6 pages with translation].
"Office Action", Australia Patent Application No. 2019240484, Aug. 2, 2021, 3 pages.
"Office Action", Canada Patent Application No. 3089312, Aug. 19, 2021, 3 pages.
"Office Action", Australia Patent Application No. 2019240484, Nov. 13, 2020, 4 pages.
"Office Action", Australia Patent Application No. 2018403182, Feb. 5, 2021, 5 pages.
"Office Action", Australia Patent Application No. 2018409860, Feb. 10, 2021, 4 pages.
"Extended European Search Report", European Patent Application No. 18907032.9, Oct. 15, 2021, 12 pages.
Marston et al., "The design of a purpose-built exergame for fall prediction and prevention for older people", European Review of Aging and Physical Activity 12:13, <URL:https://eurapa.biomedcentral.com/track/pdf/10.1186/s11556-015-0157-4.pdf>, Dec. 8, 2015, 12 pages.
Ejupi et al., "Kinect-Based Five-Times-Sit-to-Stand Test for Clinical and In-Home Assessment of Fall Risk in Older People", Gerontology (vol. 62), (May 28, 2015), <URL:https://www.karger.com/Article/PDF/381804>, May 28, 2015, 7 pages.
Festl et al., "iStoppFalls: A Tutorial Concept and prototype Contents", <URL:https://hcisiegen.de/wp-uploads/2014/05/isCtutorialdoku.pdf>, Mar. 30, 2013, 36 pages.
"Notice of Allowance", Australia Patent Application No. 2019240484, Oct. 27, 2021, 4 pages.
"Extended European Search Report", European Patent Application No. 19772545.0, Nov. 16, 2021, 8 pages.
"Office Action", Australia Patent Application No. 2018409860, Nov. 30, 2021, 4 pages.
"Office Action", Korea Patent Application No. 10-2020-7028606, Oct. 29, 2021, 7 pages [14 pages with translation].
"Office Action", India Patent Application No. 202027033318, Nov. 18, 2021, 6 pages.
"Office Action", Australia Patent Application No. 2018403182, Dec. 1, 2021, 3 pages.

(56) References Cited

OTHER PUBLICATIONS

Dubois et al., "A Gait Analysis Method Based on a Depth Camera for Fall Prevention," Proc. of the 36th Annual International Conference of the IEEE Engineering in Medicine and Biology Society (EMBS), Aug. 30, 2014, pp. 4515-4518 (Abstract only).

Marston et al., "The design of a purpose-built exergame for fall prediction and prevention for older people," European Review of Aging and Physical Activity, Dec. 8, 2015, vol. 12, pp. 1-12.

"Office Action", Japan Patent Application No. 2020-543924, Nov. 24, 2021, 3 pages [6 pages with translation].

"Extended European Search Report", European Patent Application No. EP19785057, Dec. 6, 2021, 8 pages.

"Office Action", Australia Patent Application No. 2020218172, Dec. 21, 2021, 4 pages.

"Extended European Search Report", European Patent Application No. 21187314.6, Dec. 10, 2021, 10 pages.

"Notice of Allowance", Australia Patent Application No. 2018403182, Jan. 20, 2022, 4 pages.

"Office Action", Australia Patent Application No. 2018409860, Jan. 24, 2022, 5 pages.

"Office Action", China Patent Application No. 201880089608.2, Feb. 8, 2022, 6 pages (15 pages with translation).

"International Search Report" and "Written Opinion of the International Searching Authority," Patent Cooperation Treaty Application No. PCT/US2021/056060, Jan. 28, 2022, 8 pages.

"Extended European Search Report", European Patent Application No. 19822930.4, Feb. 15, 2022, 9 pages.

"Office Action", Japan Patent Application No. 2020-550657, Feb. 8, 2022, 8 pages.

"Office Action", Singapore Patent Application No. 11202008201P, Apr. 4, 2022, 200 pages.

"Office Action", India Patent Application No. 202127033278,,Apr. 20, 2022, 7 pages.

Wasenmuller et al., "Comparison of Kinect V1 and V2 Depth Images in Terms of Accuracy and Precision", Computer Vision—ACCV 2016 Workshops (Taipei, Taiwan, Nov. 20-24, 2016), Revised Selected Papers, Part II, Mar. 16, 2017 (Mar. 16, 2017), XP055942856, DOI: 10.1007/978-3-319-54427-4, ISBN: 978-3-319-54427-4 Retrieved from the Internet: URL: https://link.springer.com/content/pdf/10.1007/978-3-319-54427-4_3.pdf>, pp. 1-12.

Stone et al., "Evaluation of an Inexpesive Depth Camera for In-Home Gait Assessment," Journal of Ambient Intelligence and Smart Environments Jan. 2011 3(4); pp. 349-361.

* cited by examiner

DEALER INFORMATION

FULL NAME [ ]

ADDRESS [ ] STATE [ ]
CITY [ ] ZIPCODE [ ]

PHONE [ ] EMAIL [ ]

RECRUITER'S NAME [ ] RECRUITER'S ID [ ]

[ ]

↓ ↓ ↓

DEALER INFORMATION

FULL NAME [JOHN DOE]

ADDRESS [1234 SOUTH MAIN ST] STATE [NEW MEXICO]
CITY [LAS CRUCES] ZIPCODE [88001]

PHONE [(5575)525-1234] EMAIL [JOHN@EXAMPLE.COM]

RECRUITER'S NAME [JANE SMITH] RECRUITER'S ID [12245]

POLICY AND PROCEDURES AGREEMENT

COMPUTING DEVICES WITH IMPROVED INTERACTIVE ANIMATED CONVERSATIONAL INTERFACE SYSTEMS

CROSS REFERENCE TO RELATED APPLICATIONS

This application claims the priority benefit of U.S. Provisional Patent Application Ser. No. 62/618,550 filed on Jan. 17, 2018 and titled "Interactive Animated Conversational Interface System," which is hereby incorporated by reference in its entirety.

FIELD OF THE TECHNOLOGY

Embodiments of the disclosure relate to computing devices with improved interactive animated conversational interface systems.

SUMMARY

Provided herein are exemplary systems and methods including an interactive conversational text-based interaction (ECG_Forms) and a three-dimensional Electronic Caregiver Image (ECI) avatar that allows a user to complete various forms using voice conversation and cloud-based talk-to-text technology. Through the system, the ECI avatar may communicate in multiple languages. The system provides a user with the option of selecting methods for data input comprising either traditional type based data entry or voice communication data entry. Following the user input of data, the system uses cloud-based database connectivity to review user input and provide redundancy against data input errors. When errors are discovered by the system, feedback is provided to the user for correction of errors. To assess data for accuracy in real-time, the system utilizes a catalogue of inputs to determine whether a data type input by the user matches a defined catalogue data type. As such, through the use of cloud-based applications, the system completes data assessment, executes the continuation decision process and provides a response to the user in less than 1.0 second. Once data has been assessed for accuracy and all user data are entered into the system, the system encrypts user input data and proceeds with transmitting the data to a cloud-based primary key design database for storage. The system also provides a company web browser comprising the three-dimensional Electronic Caregiver Image (ECI) avatar for interactive communication with the user. This ECI avatar provides the user with an interactive experience during which the user is guided through the completion of the process. As the process is completed by the user, the ECI avatar provides real-time feedback in conversational form in an effort to simplify and streamline the form completion by the user.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 2A depicts successful completion of a data form.

FIGS. 5-19 show exemplary specific, structured interactive animated conversational graphical interfaces with the ECI avatar.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure.

Various exemplary embodiments described and illustrated herein relate to a computing device comprising a display screen, the computing device being configured to dynamically display a specific, structured interactive animated conversational graphical interface paired with a prescribed functionality directly related to the interactive animated conversational graphical user interface's structure. Accordingly, a user is provided with an interactive conversational interface comprising the Electronic Caregiver Forms (ECG_Forms), text-based conversation, and the Electronic Caregiver Image (ECI), which comprises a three-dimensional avatar paired with voice-driven interaction, all of which may be presented within a web browser.

User data input into document fields is typically tedious and boring for the user. It is also highly prone to human error. As such, text-based conversational "chatbots" have become an increasingly popular interactive option for the replacement of simple keystroke text entry by user paradigms.

As chatbot programs have developed in recent years, they have been incorporated in the effective simulation of logical conversation during human/computer interaction. The implementation of these chatbots has occurred via textual and/or auditory methods effectively providing human users with practical functionality in information acquisition activities. In most cases today, chatbots function simply to provide a conversational experience during the obtaining of data from a user.

As chatbot programs have progressed, the knowledge bases associated with their capabilities have become increasingly complex, but the ability to validate user responses in real-time remains limited. Additionally, the capability of chatbot programs to be functionally incorporated across vast networks is significantly lacking. As such, most chatbot programs cannot be incorporated across multiple systems in a manner that allows them to collect user data while simultaneously verifying the type of data input by the user, transmit data input by the user to various storage sites for further data validation, store data offsite in cloud-based storage solutions and overwrite existing stored data based on new user inputs, all while providing a virtual avatar which guides the user through the data entry process.

Figure 1:
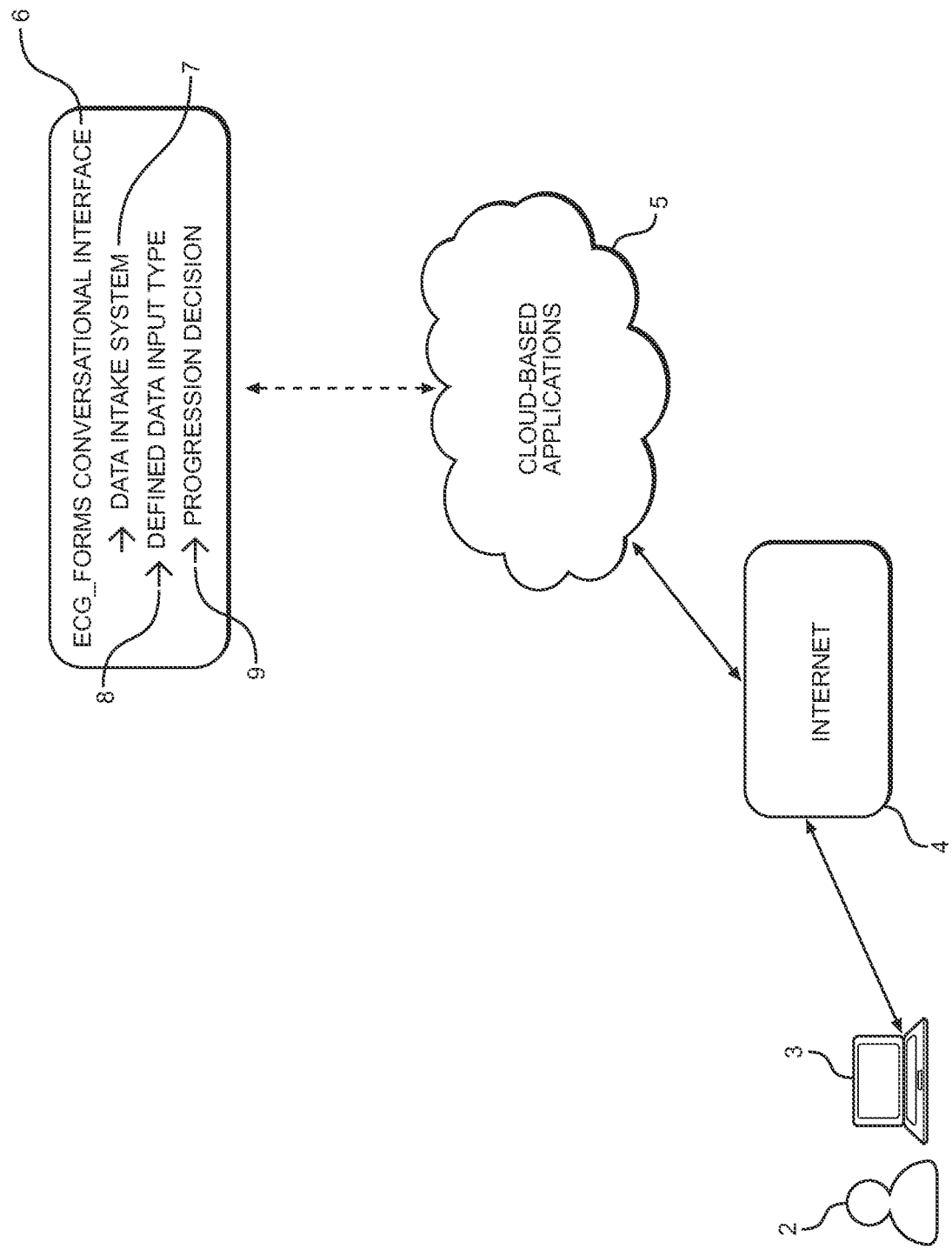
FIG. 1 details the connectivity and processes associated with a ECG_Forms text-based conversational interface.

FIG. 1 illustrates an exemplary system in which a user 2 utilizes a computing device or connected device 3 to connect to the internet 4 to access relevant services necessary to complete various forms. Upon connection to the internet 4, the user 2 is provided access to cloud-based applications 5 which comprise conversational decision trees providing the capability of communicating through both voice and text as illustrated by ECG_Forms Conversational Interface 6. According to various exemplary embodiments, this allows for conversational speech communication to be carried out between user 2 and computing device 3.

In FIG. 1, according to various exemplary embodiments, ECG_Forms Conversational Interface 6 functions to request data input from user 2. Following this request, ECG_Forms Conversational Interface 6 waits for a response from user 2. Upon receiving a response, Data Intake System 7 intakes this data into the system. Once data from user 2 is taken into ECG_Forms Conversational Interface 6, the system compares the data type (for example, words, numbers, email, etc.) of the input to the data found in Defined Data Input Type 8 to assess the validity of user input types. Once the type of user input is determined to be valid, Progression Decision Program 9 is activated, resulting in ECG_Forms Conversational Interface 6 moving on to the next item to be inquired of user 2.

FIG. 2A shows the result of the successful completion of a form.

Figure 2B:
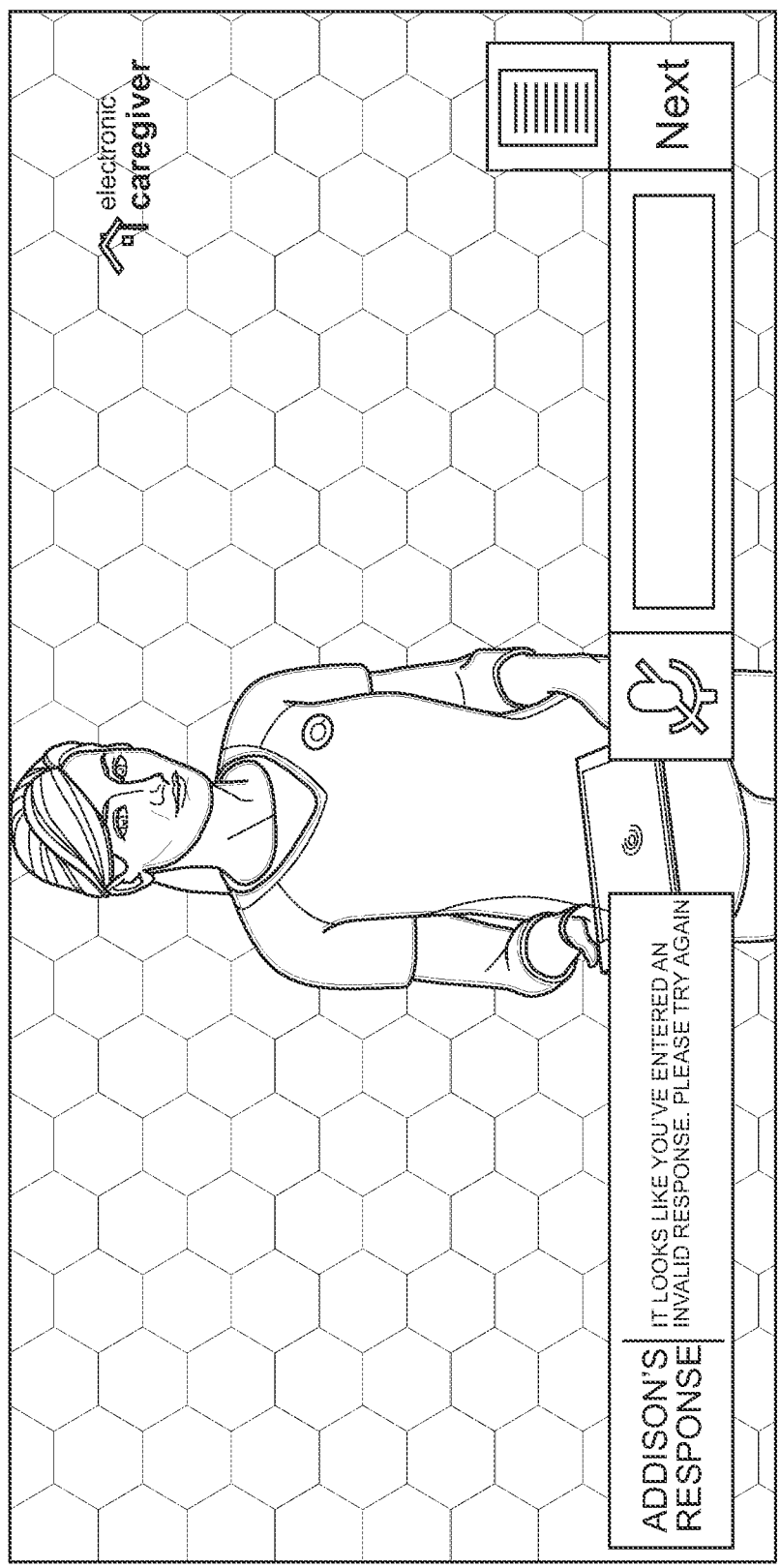
FIG. 2B shows an exemplary specific, structured interactive animated conversational graphical interface including an avatar, depicting the result of the input of invalid data.

FIG. 2B shows an exemplary specific, structured interactive animated conversational graphical interface including an avatar, depicting what occurs when data input by user 2 is deemed invalid by Defined Data Input Type 8 (FIG. 1), resulting in a "no" decision from Progression Decision Program 9 (FIG. 1).

Figure 3:
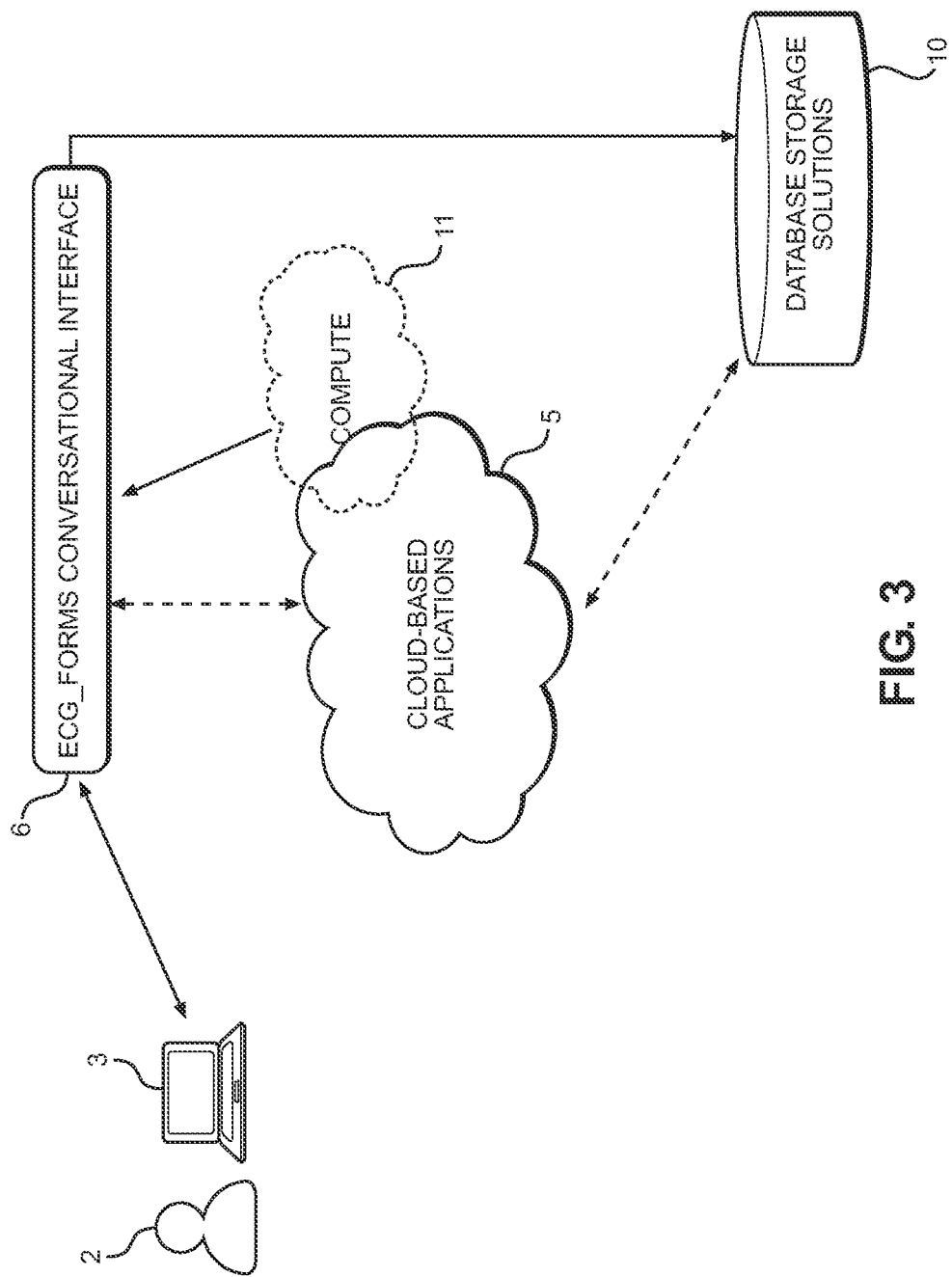
FIG. 3 depicts an exemplary architecture for further validating user input.

FIG. 3 depicts an exemplary architecture for further validating user input. This is achieved as user 2 inputs data into computing device 3. This data is transmitted to ECG_Forms Conversational Interface 6. Cloud-Based Applications 5 are communicatively coupled to Database Storage Solutions 10, which comprises defined data specifications and previously stored inputs from user 2. As ECG_Forms Conversational Interface 6 processes data input into the system by user 2, it also compares the data to data stored in Database Storage Solutions 10 for validation. Upon ECG_Forms Conversational Interface 6 determining that input data from user 2 is valid, the input data progresses across the entirety of the form being completed, and Cloud-Based Applications 5 and Compute 11 functions (as housed in Cloud-Based Applications 5) are called and result in ECG_Forms Conversational Interface 6 transmitting the completed data form for storage in Database Storage Solutions 10.

Figure 4:
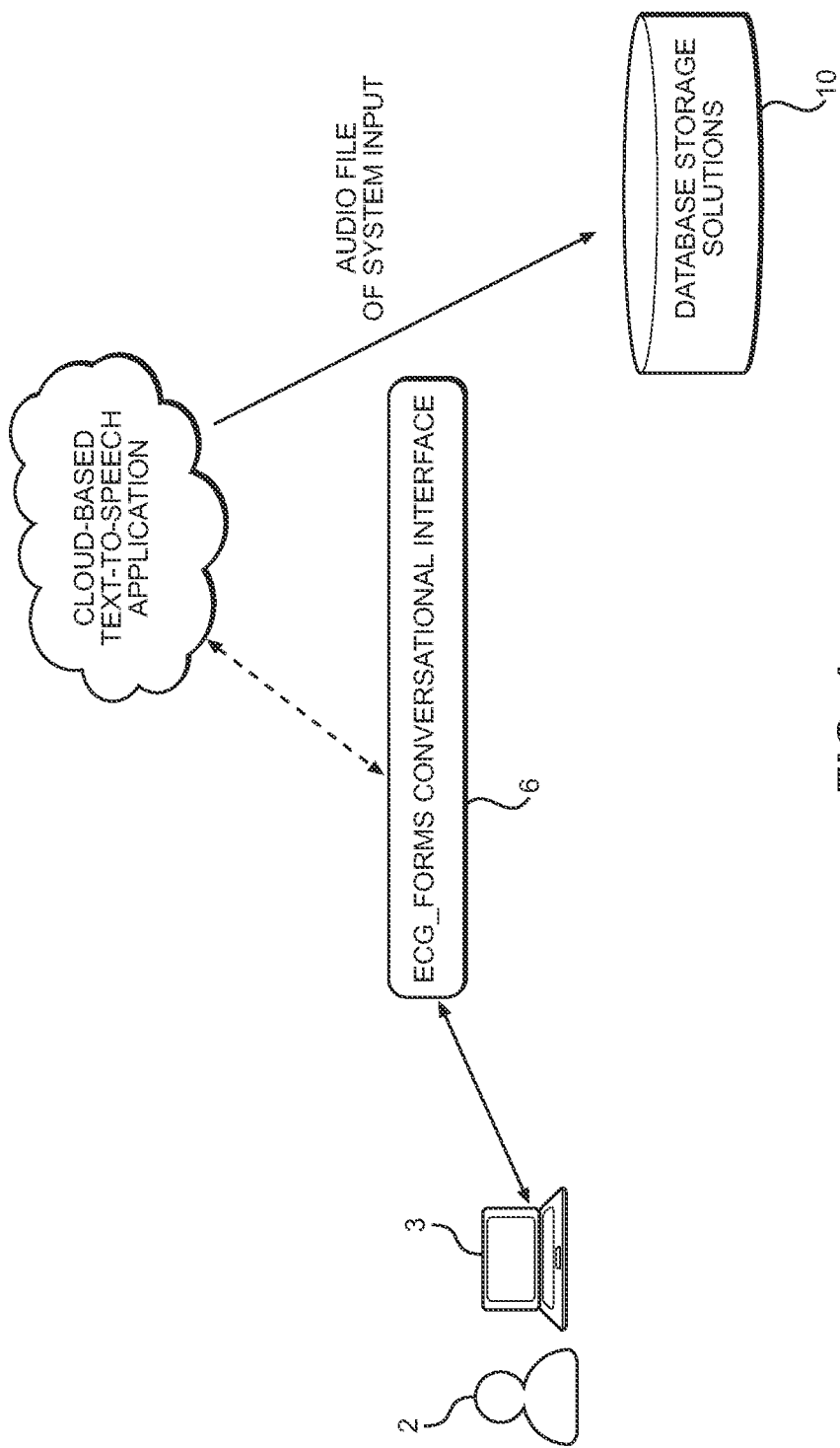
FIG. 4 shows an exemplary architecture for the conversion of input from a user to speech configured for an ECI Avatar.
Figure 5:
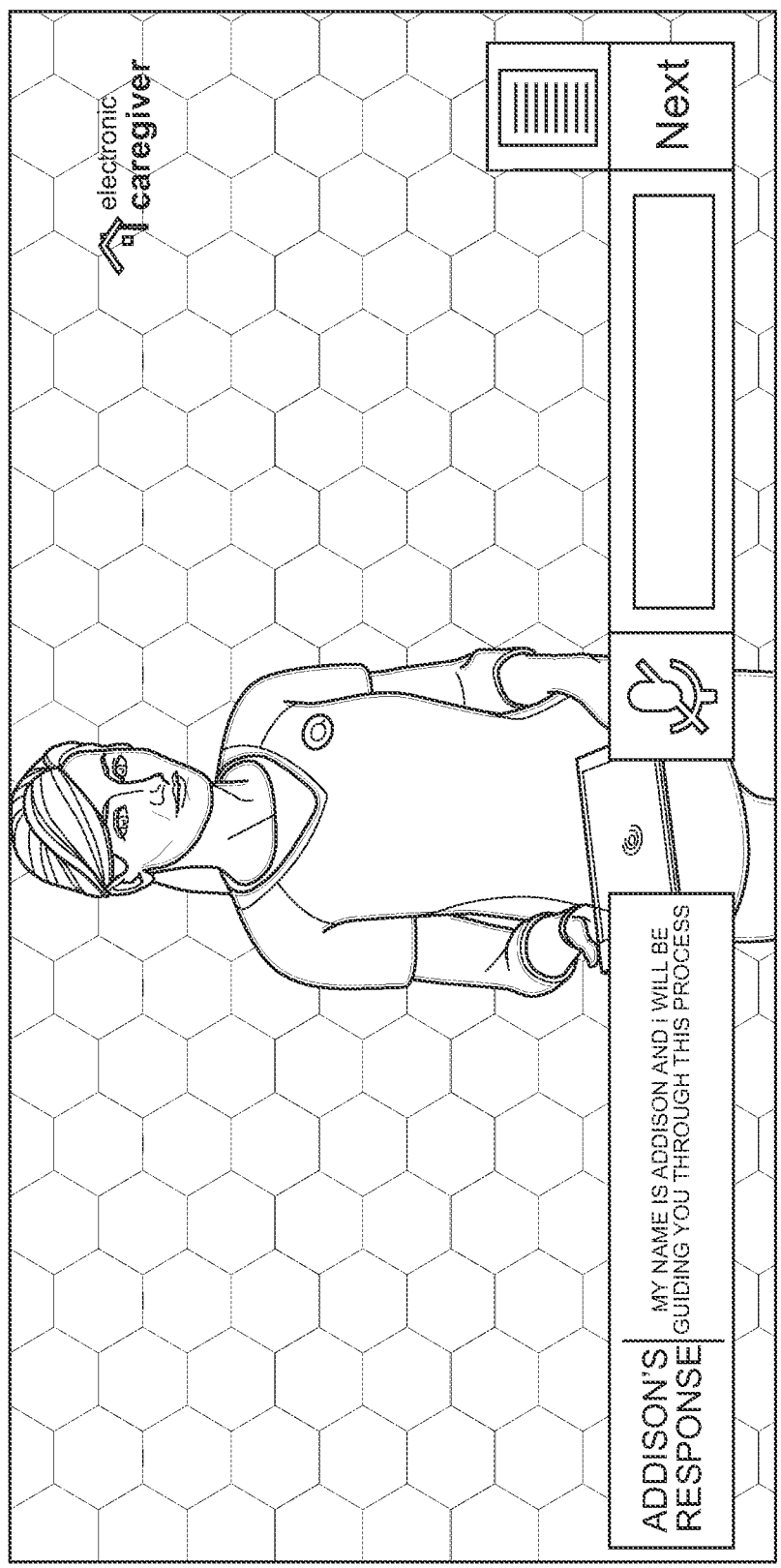
Figure 6:
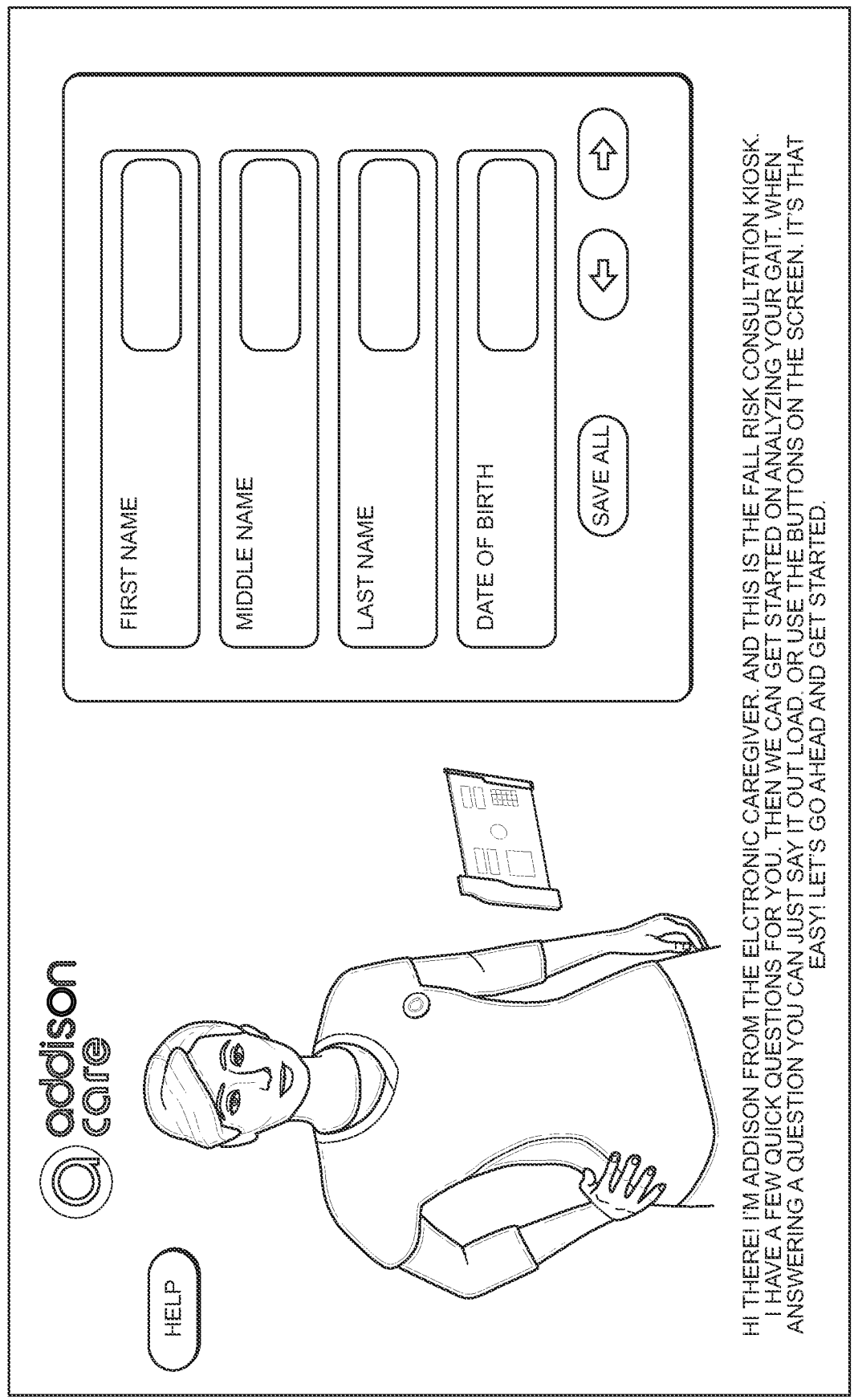
Figure 7:
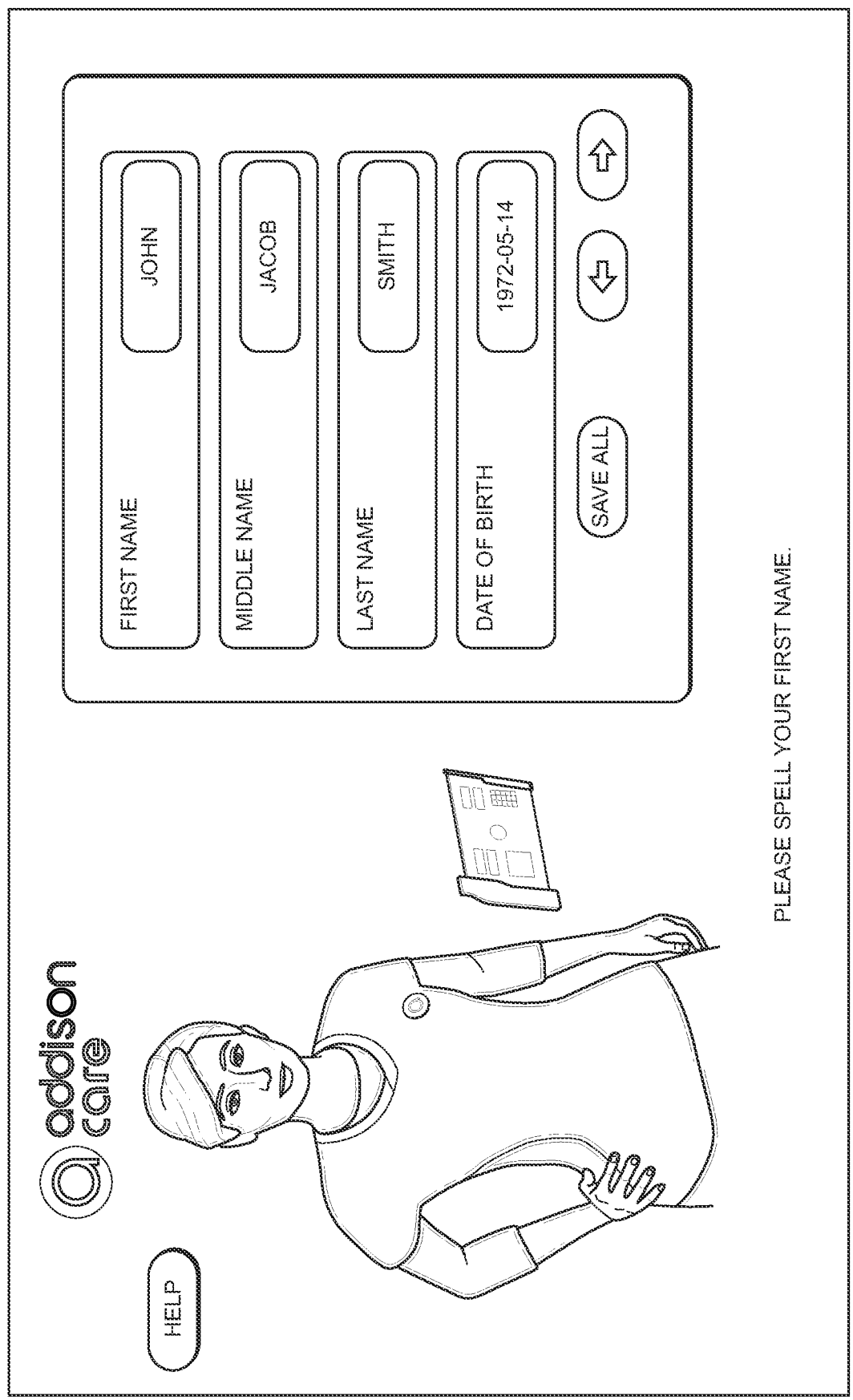
Figure 9:
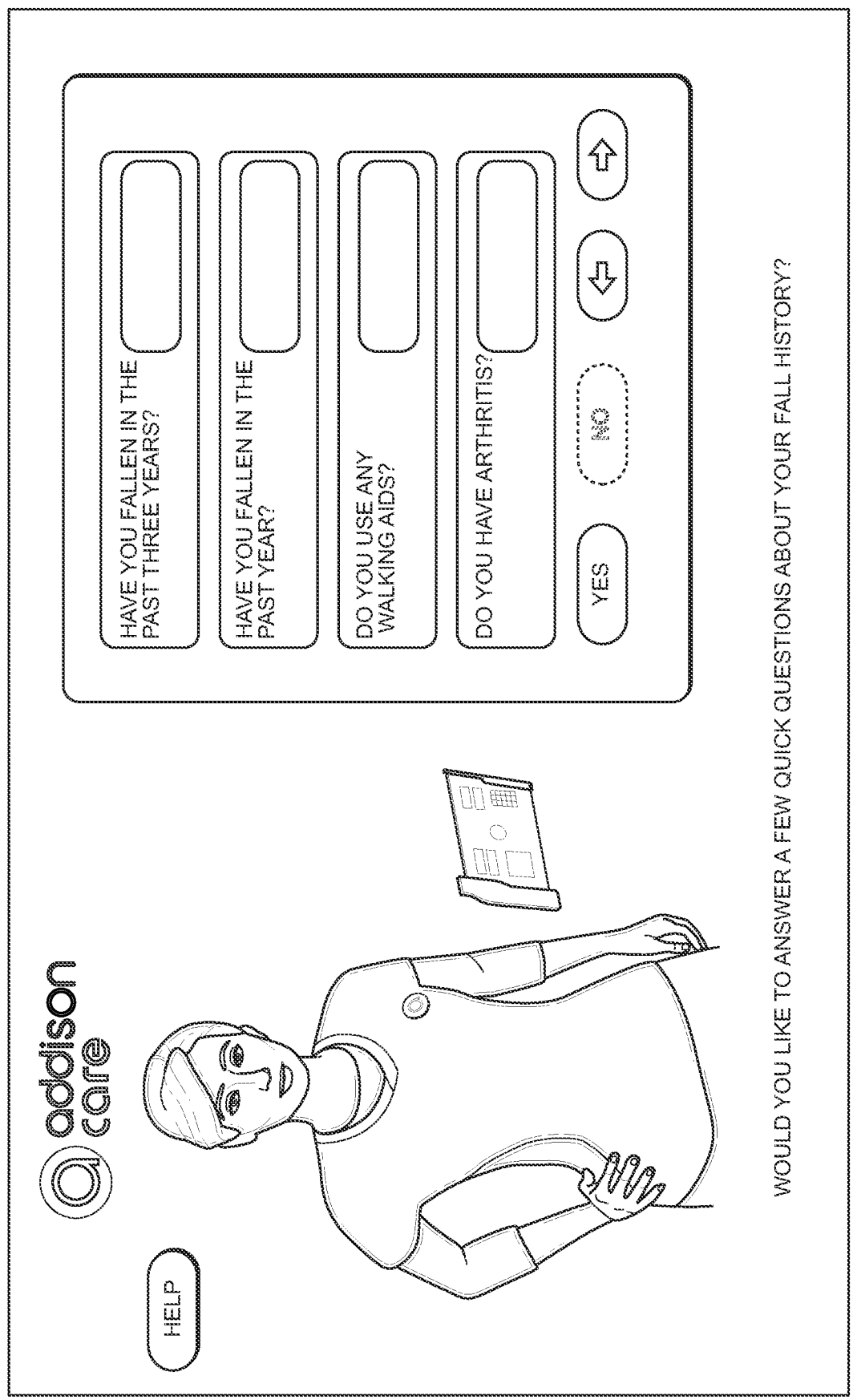
Figure 10:
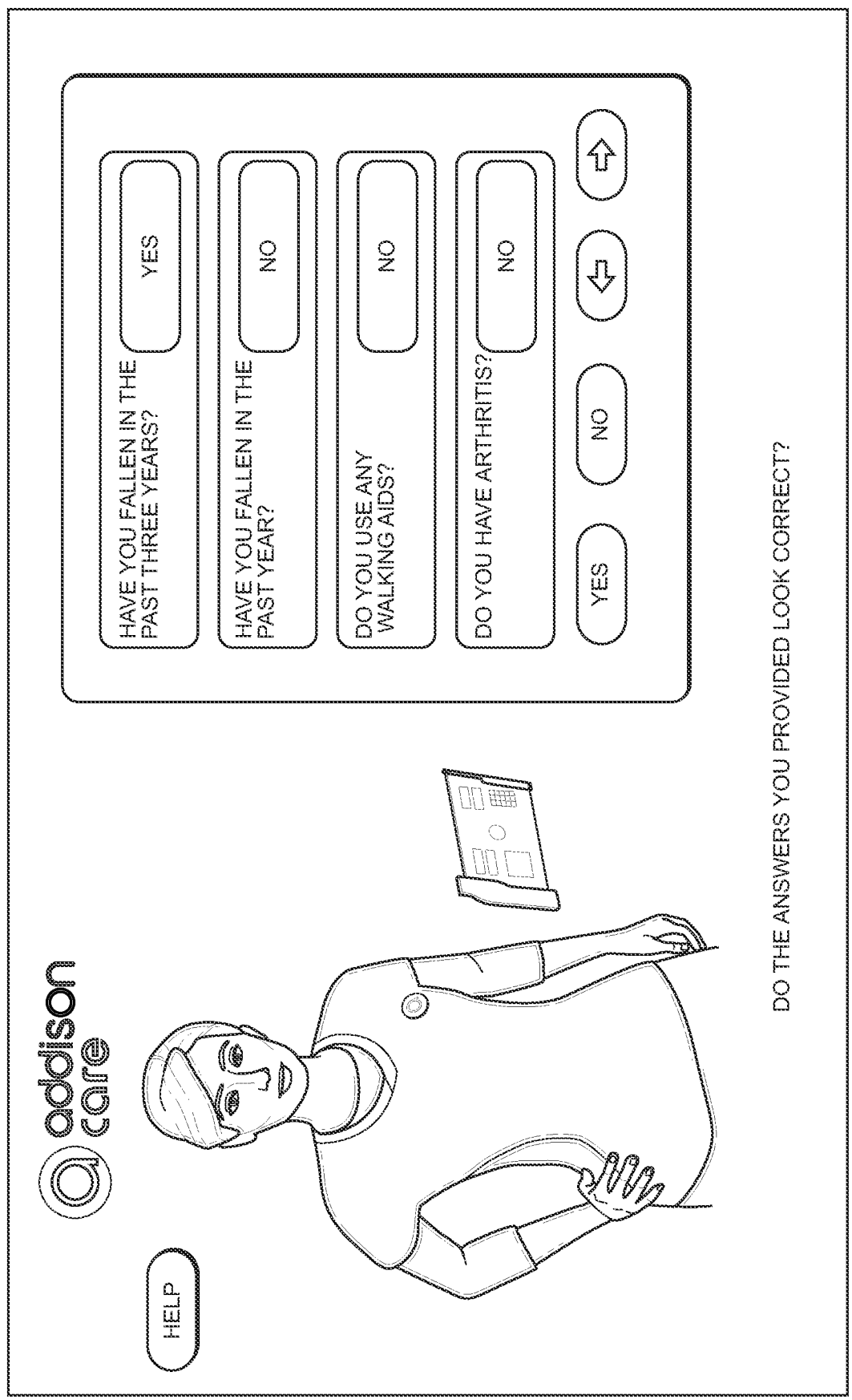
Figure 11:
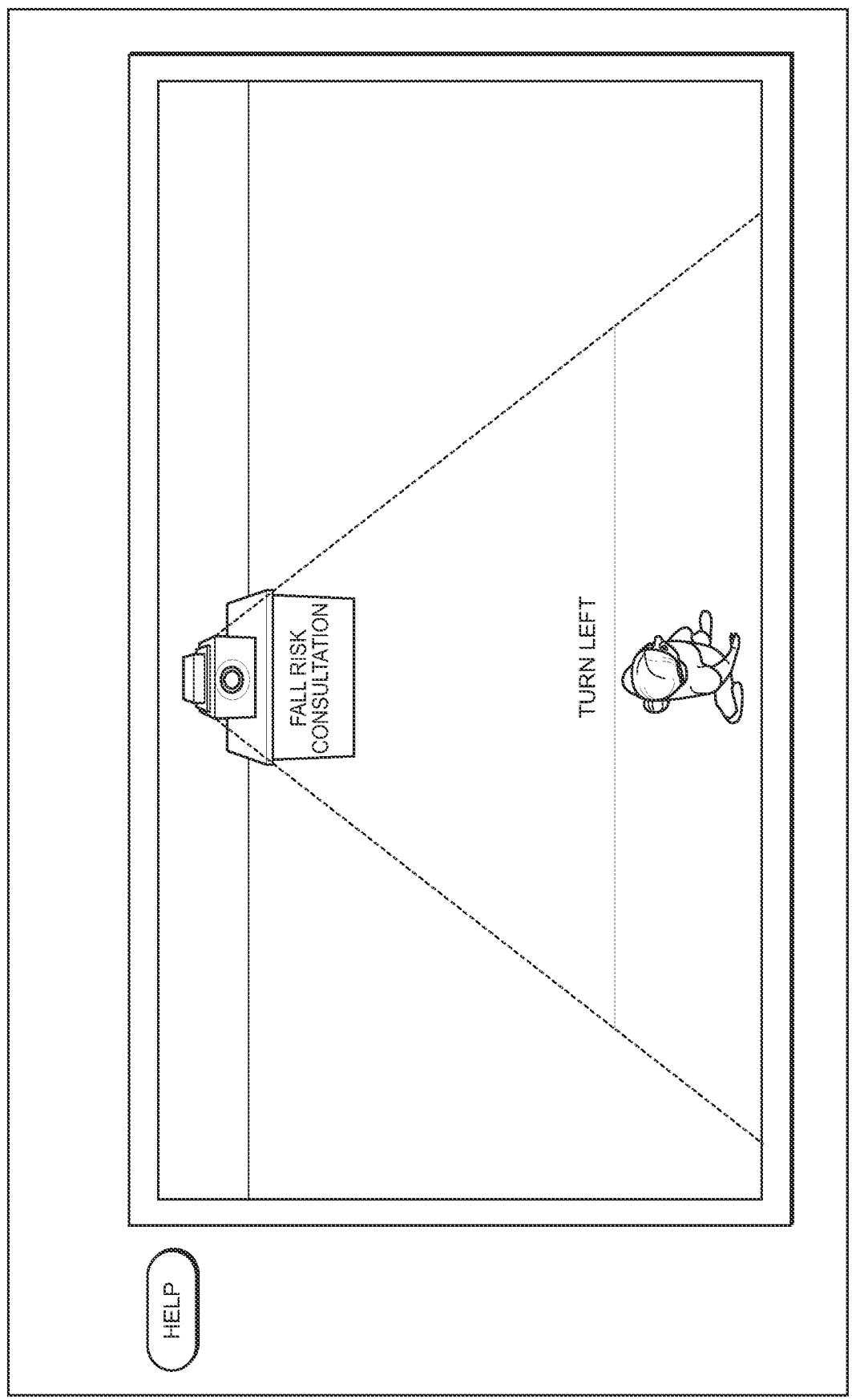
Figure 12:
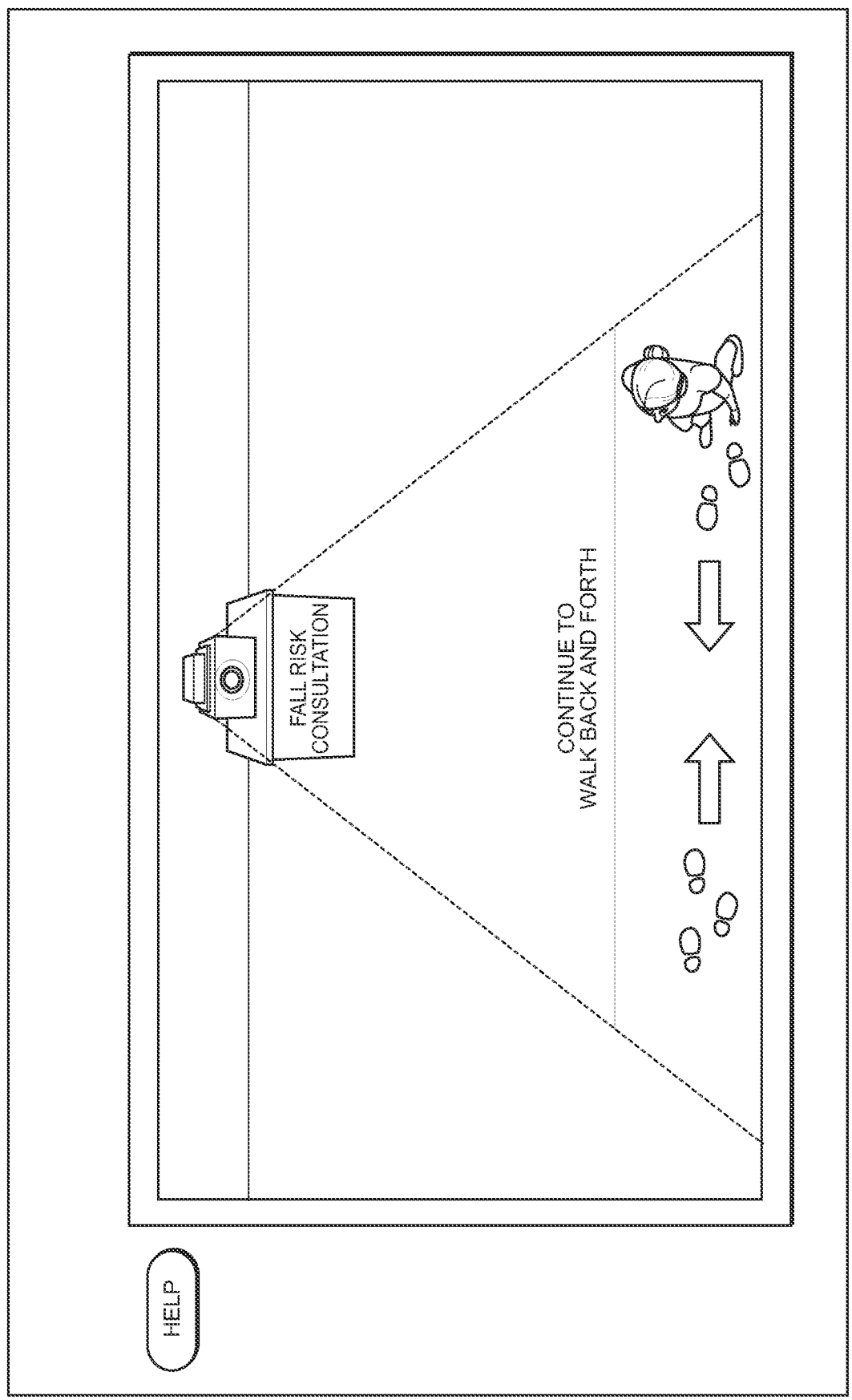
Figure 13:
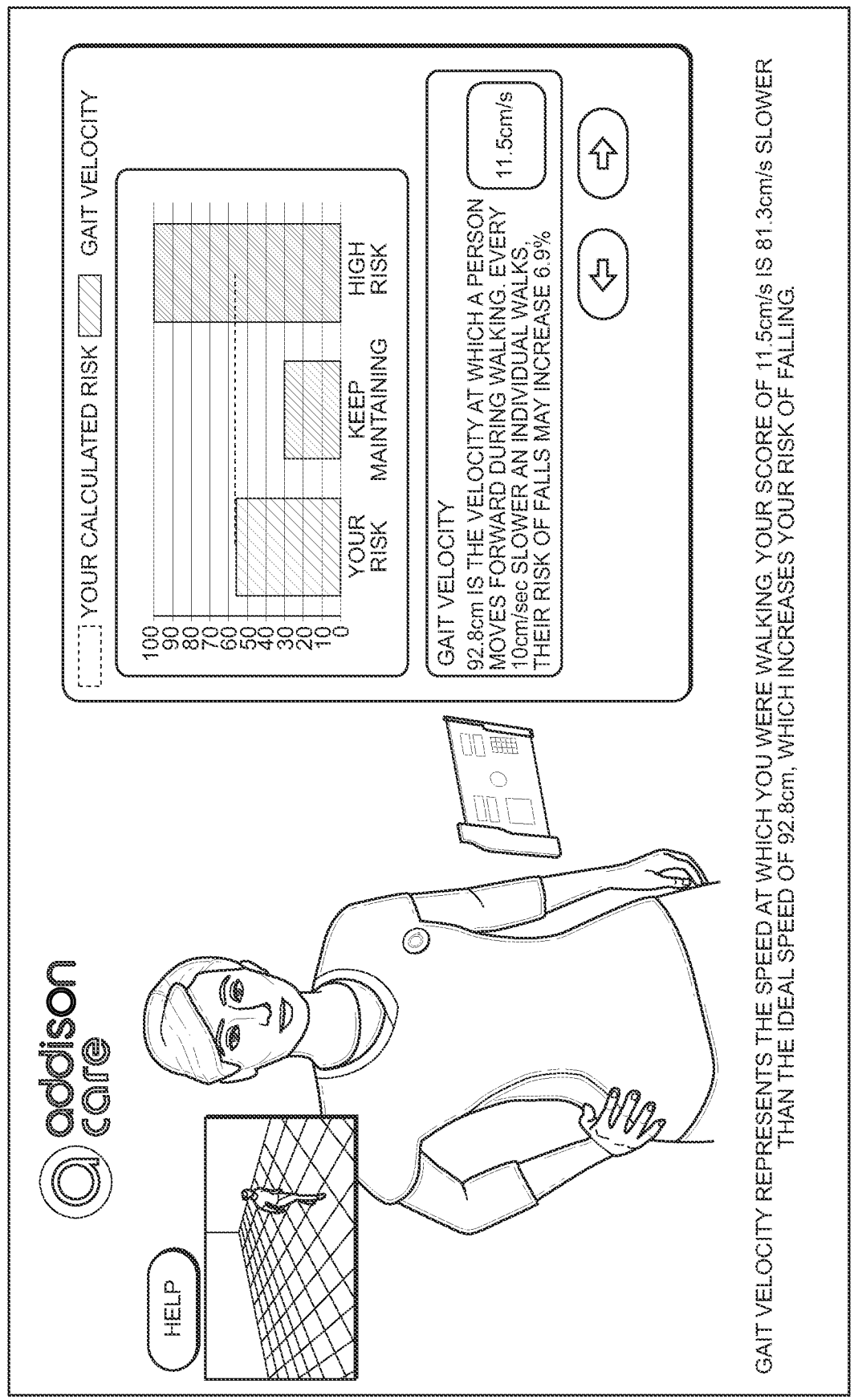
Figure 14:
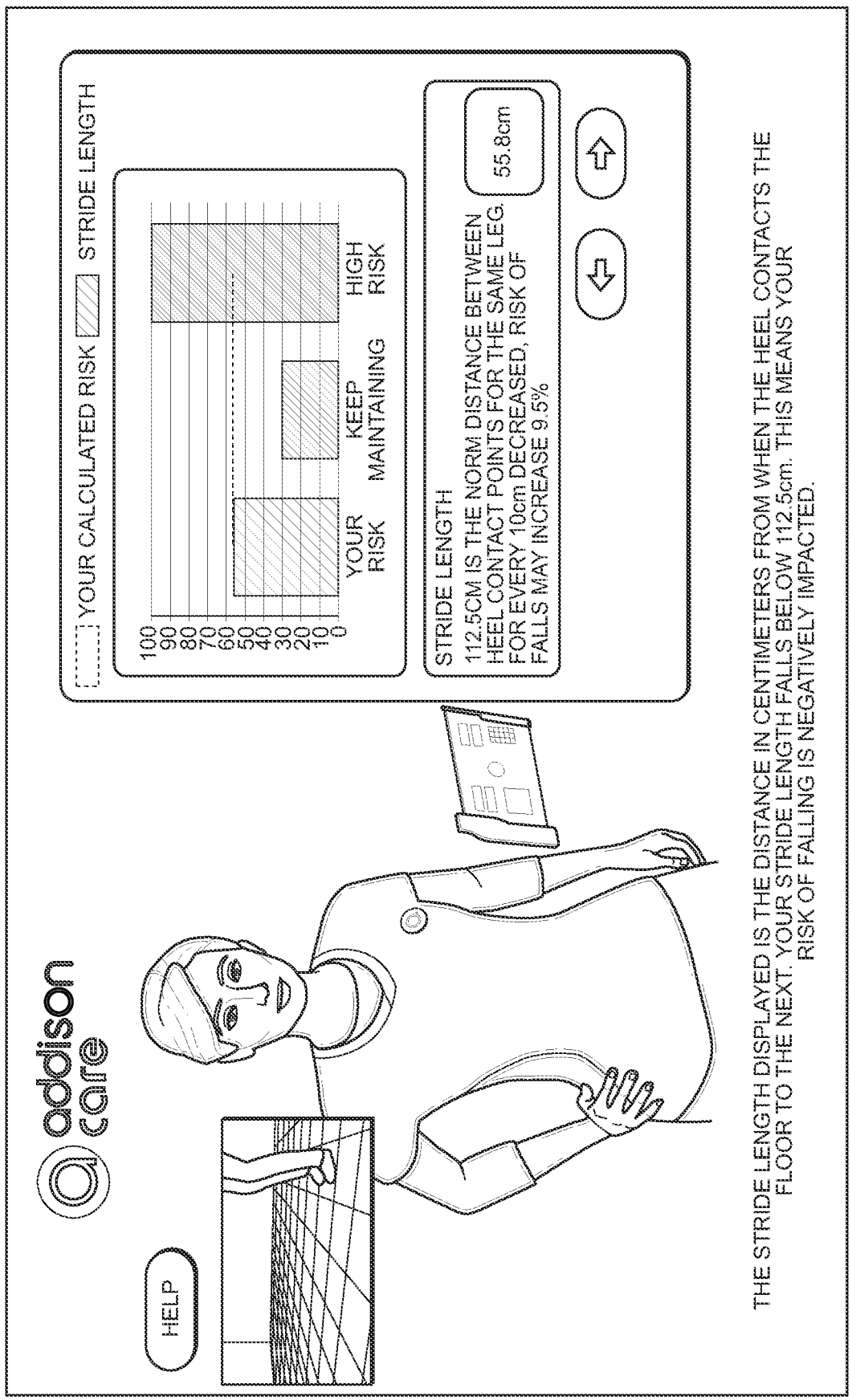
Figure 15:
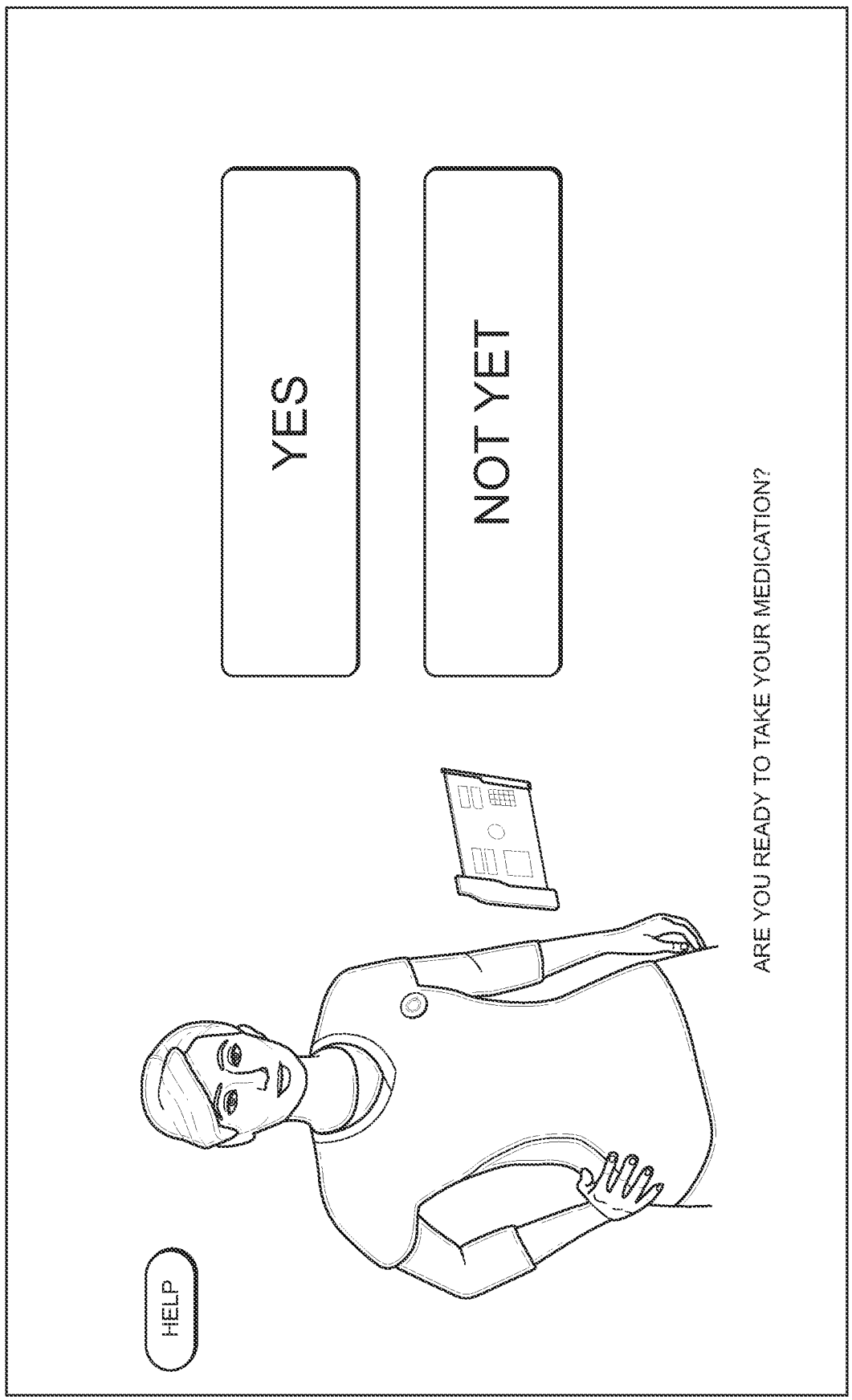
Figure 16:
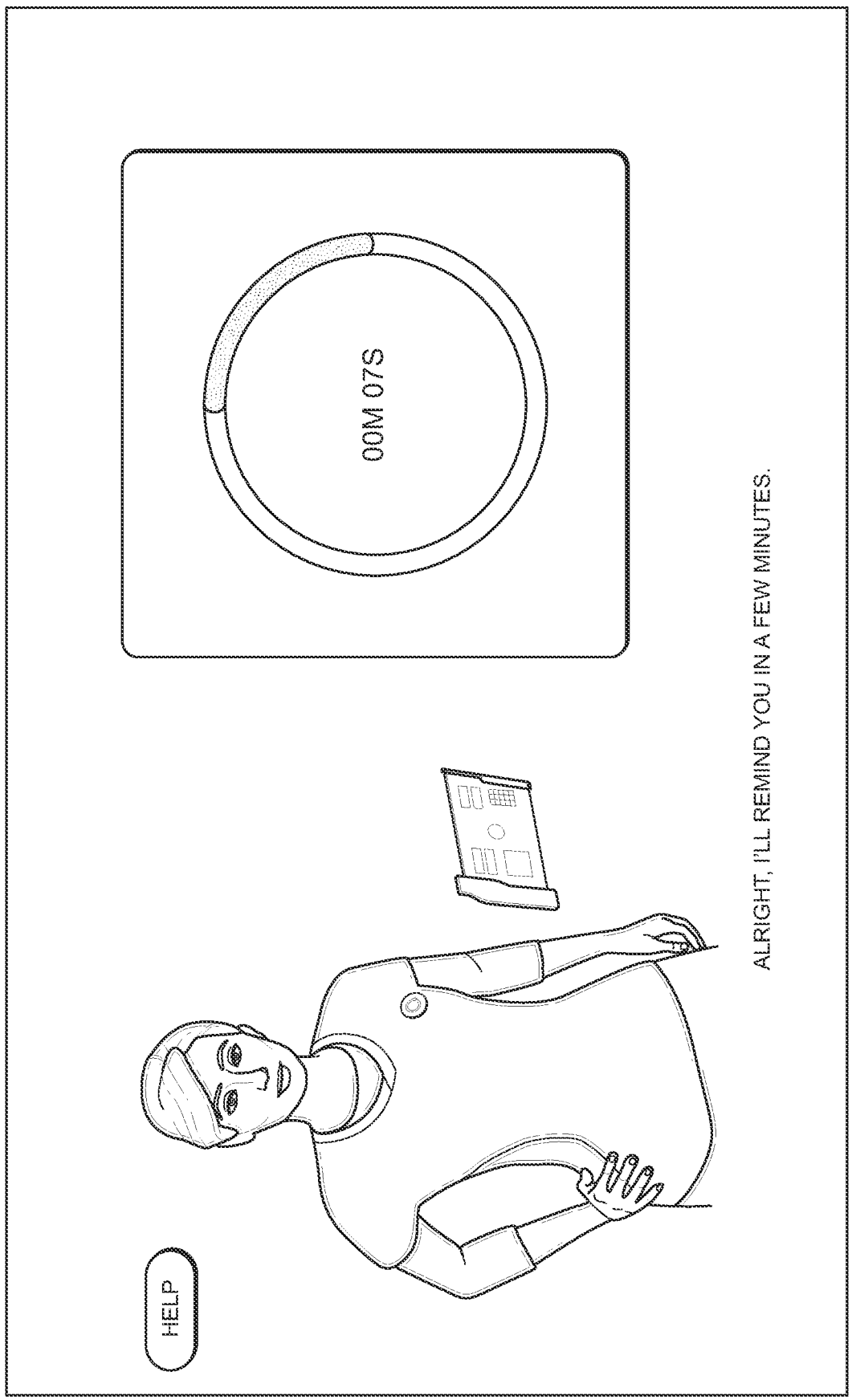
Figure 17:
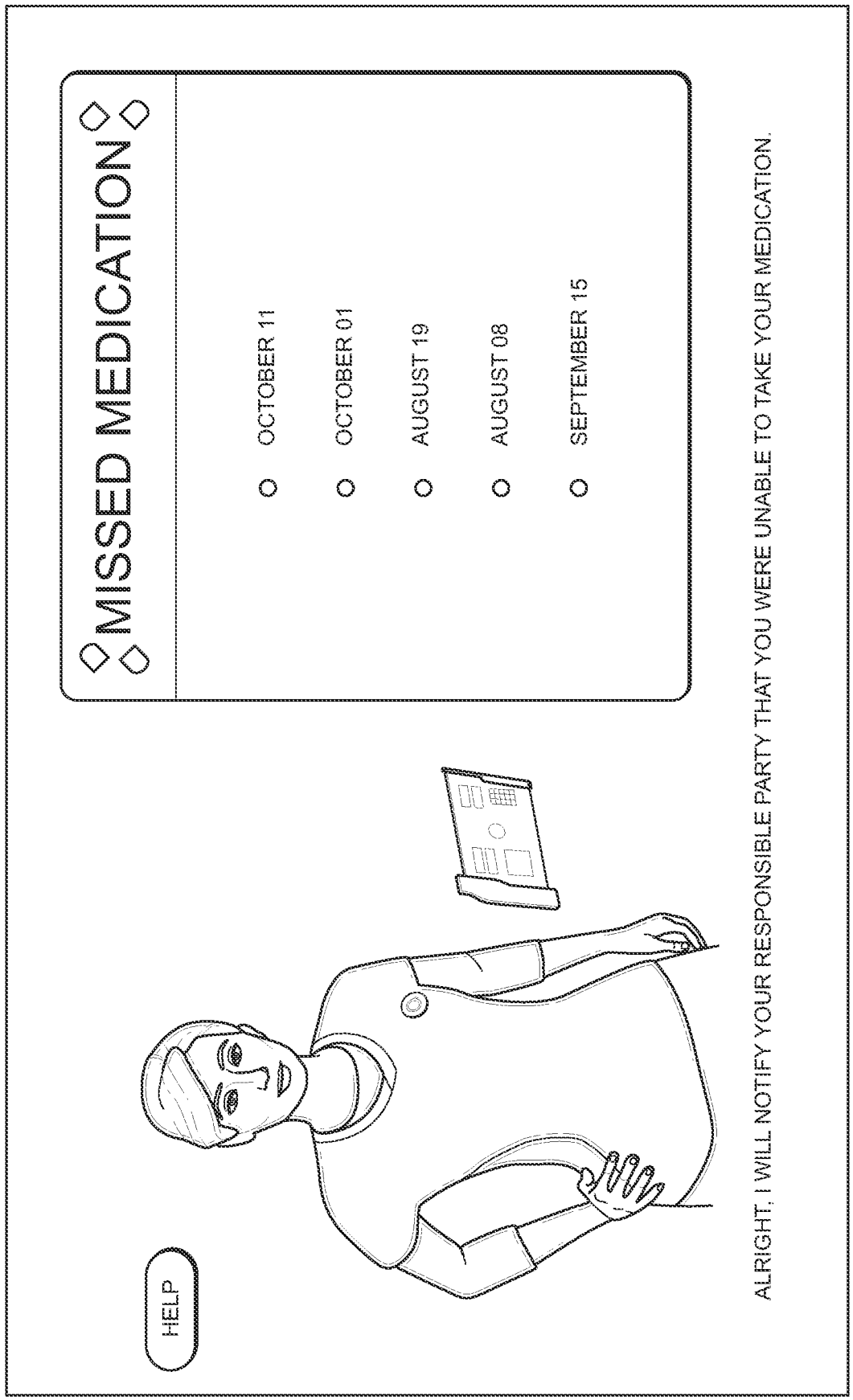
Figure 18:
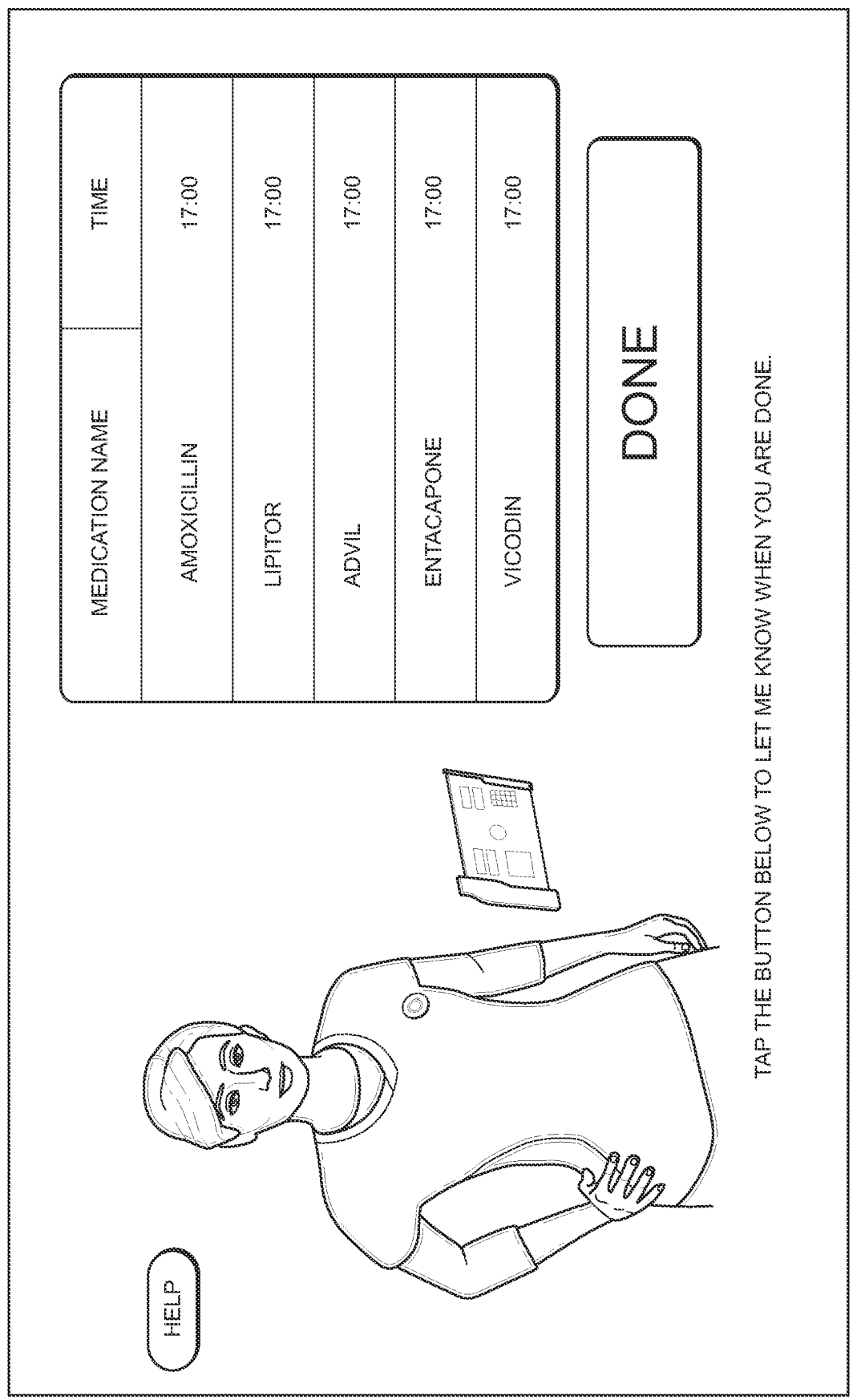
Figure 19:
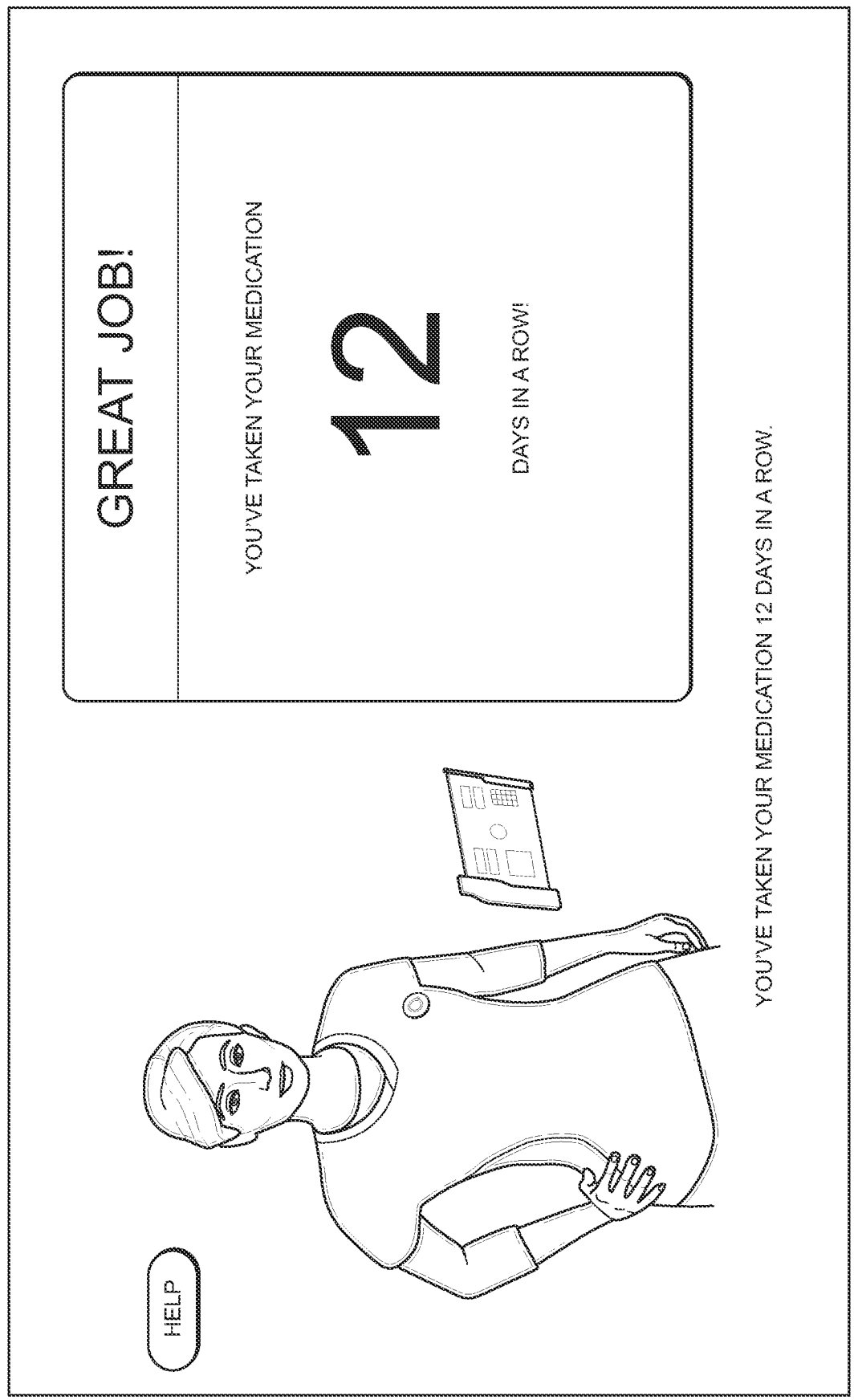

FIG. 4 shows an exemplary architecture for the conversion of input from user 2 to speech configured for an ECI Avatar (FIG. 5). This occurs through Cloud-Based Applications 5 (FIG. 3). The data input by user 2 into Computing Device 3 and transmitted to ECG_Forms Conversational Interface 6 is further processed by Cloud-Based Text-to-Speech Application and converted into an audio file. Once the conversion to audio has been completed, the newly created audio file is transmitted to Database Storage Solutions 10 for storage and for recall by the ECI Avatar (FIG. 5) when needed.

FIGS. 5-19 show exemplary specific, structured interactive animated conversational graphical interfaces with the ECI avatar.

According to various exemplary embodiments, a three-dimensional Electronic Caregiver Image (ECI) avatar as depicted in FIG. 5 functions to guide the user (such as user 2 in FIGS. 1, 3 and 4) through the data entry process in an effort to reduce user errors in completing documents. This is achieved through the utilization of multiple cloud-based resources (such as Cloud-Based Applications 5 in FIG. 3) connected to the conversational interface system. For the provision of ECI responses from the avatar to user inquiries, either Speech Synthesis Markup Language (SSML) or basic text files are read into the system and an audio file is produced in response. As such, the aspects of the avatar's response settings such as voice, pitch and speed are controlled to provide unique voice characteristics associated with the avatar during its response to user inquiries.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A computing device comprising:
a display screen configured to dynamically display within a web browser of the computing device a specific, structured interactive animated conversational graphical interface paired with a prescribed functionality directly related to the interactive animated conversational graphical interface's structure, the specific, structured interactive animated conversational graphical interface configured to:
request response data from a human user by the computing device;
receive the response data from the human user by the computing device;
encrypt the response data prior to transmission to a cloud-based storage;
convert the response data into an audio file using a cloud-based text-to-speech application capable of being integrated into a web browser-based avatar, the web browser-based avatar being displayed on the display screen within the web browser of the computing device as a three-dimensional electronic image of a human health caregiver for the human user;
transmit the response data to a cloud-based storage for validation, retention, and processing, the validation, the retention, and the processing being performed by a cloud-based application communicatively coupled to the cloud-based storage; and
produce a responsive audio file by the processing of the response data, the processing comprising applying a conversational decision tree to the response data to produce output data, reading in the output data from the cloud-based application in Speech Synthesis Markup Language to produce the responsive audio file, and further comprising using the Speech Synthesis Markup Language to control at least one aspect of the responsive audio file as delivered by the web browser-based avatar;

further comprising the three-dimensional electronic image of the human health caregiver providing step-by-step verbal health care instructions to the human user;

the three-dimensional electronic image of the human health caregiver providing the human user with a survey comprising questions directed to eliciting information regarding assessing falls risk; and the three-dimensional electronic image of the human health caregiver receiving the elicited information comprising answers to the questions that are indicative of a risk of falling of the human user.

2. The computing device of claim 1, being any form of computing device, including a personal computer, laptop, tablet, or mobile device.

3. The computing device of claim 1, wherein the display screen is further configured to display a plurality of data entry options to the human user, the plurality of data entry options comprising two or more of: voice, type, touch, or combinations thereof.

4. The computing device of claim 1, wherein the display screen is further configured to display a real-time updated user interface comprising a plurality of received entries from the human user within a web browser-based dialogue box.

5. The computing device of claim 1, the validation based on characteristics defined within the specific, structured interactive animated conversational graphical interface.

6. The computing device of claim 1, the validation comprising comparing the response data provided by the human user with external data stored in a cloud-based database.

7. The computing device of claim 1, further configured to receive data from the human user, determine that the received data is valid, and display a progression to a next item within a form.

8. The computing device of claim 1, further configured to receive data from the human user, determine that the received data is invalid, and determine that a progression to a next item within a form is not warranted.

9. The computing device of claim 1, wherein the specific, structured interactive animated conversational graphical interface is further configured to complete and update a database entry in a database that is in communication with the computing device.

10. The computing device of claim 1, wherein the display screen is further configured to display at least one form within the web browser, the at least one form immediately transmitted by the computing device to the cloud-based storage upon completion of all requested data input by the human user.

11. The computing device of claim 10, wherein any previous entries to the at least one form are updated within the cloud-based storage based on new data input by the human user.

12. The computing device of claim 1, wherein the specific, structured interactive animated conversational graphical interface is further configured to convert text data received from the human user into voice data for storage and also for use in conversation with the human user.

13. The computing device of claim 1, wherein the web browser-based avatar is configured to provide guidance and feedback to assist the human user during utilization of the specific, structured interactive animated conversational graphical interface.

14. The computing device of claim 1, wherein the step-by-step verbal health care instructions from the three-dimensional electronic image of the human health caregiver are converted into text that is displayed within the web browser in realtime.

15. The computing device of claim 1, wherein the three-dimensional electronic image of the human health caregiver is configured to receive at least one inquiry from the human user regarding at least one form presented on the display screen to the human user.

16. The computing device of claim 1, wherein the three-dimensional electronic image of the human health caregiver is further configured to converse with the human user in at least two conversational languages.

17. The computing device of claim 1, wherein the validation is further based on a determination that the response data provided by the human user matches a predefined expected data type.

18. The computing device of claim 1, the at least one aspect of the responsive audio file being any one of: a voice, a pitch, and a speed of the audio file as delivered by the web browser-based avatar.

19. The computing device of claim 1, further comprising reading a basic text file into the cloud-based application to further control the at least one aspect of the responsive audio file.

20. The computing device of claim 1, the specific, structured interactive animated conversational graphical interface configured to overwrite existing stored data based on new user inputs.

* * * * *